(12) United States Patent
Khafizov et al.

(10) Patent No.: US 11,637,928 B2
(45) Date of Patent: *Apr. 25, 2023

(54) METHOD AND APPARATUS FOR SUMMARIZATION OF DIALOGS

(71) Applicant: Verizon Patent and Licensing Inc., Basking Ridge, NJ (US)

(72) Inventors: Farid Khafizov, Plano, TX (US); Vittal N. Gunturu, Coppell, TX (US); Travis R. McLaren, Southlake, TX (US); Wade W. Hiney, Grapevine, TX (US); Aleksandr Iakubovich, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/509,594

(22) Filed: Oct. 25, 2021

(65) Prior Publication Data

US 2022/0046131 A1     Feb. 10, 2022

Related U.S. Application Data

(63) Continuation of application No. 16/939,800, filed on Jul. 27, 2020, now Pat. No. 11,272,058.

(51) Int. Cl.
*H04M 3/51*    (2006.01)
*G06Q 30/02*    (2023.01)
(Continued)

(52) U.S. Cl.
CPC .......... *H04M 3/5183* (2013.01); *G06F 40/30* (2020.01); *G06N 3/049* (2013.01);
(Continued)

(58) Field of Classification Search
CPC ............ H04M 3/5183; H04M 3/5175; H04M 3/2218; G06Q 30/0281
(Continued)

(56) References Cited

U.S. PATENT DOCUMENTS 9,167,095 B1    10/2015   Selvin et al.
10,623,572 B1    4/2020   Copeland
(Continued)

OTHER PUBLICATIONS

Zhong, et al., "Extractive Summarization as Text Matching", in proceedings of 58th Annual Meeting of ACL, 2020, pp. 5197-6208.
(Continued)

*Primary Examiner* — Thjuan K Addy

(57) ABSTRACT

A method for summarizing dialogs may include obtaining an agent text stream and a customer text stream, segmenting the agent text stream and customer text stream into sentences, and labeling sentences associated with the segmented agent text stream and the segmented customer text stream. The method may further include extracting sentences from the agent text stream and the customer text stream based upon frequencies of appearance of words and terms of interest; generating an agent summary paragraph based on the extracted sentences from the agent text stream, and generating a customer summary paragraph based on the extracted sentences from the customer text stream. The method may identify keywords associated with each of the agent summary paragraph and the customer summary paragraph.

20 Claims, 10 Drawing Sheets

(51) Int. Cl.
H04M 3/22 (2006.01)
G06N 3/049 (2023.01)
G06F 40/30 (2020.01)
(52) U.S. Cl.
CPC ...... *G06Q 30/0281* (2013.01); *H04M 3/2218* (2013.01); *H04M 3/5175* (2013.01)
(58) Field of Classification Search
USPC ....... 379/266.1, 242, 265.02, 265.03, 265.01
See application file for complete search history.

(56) References Cited

U.S. PATENT DOCUMENTS

| | | | |
|---|---|---|---|
| 10,735,585 | B1 | 8/2020 | Johnston |
| 10,735,586 | B1 * | 8/2020 | Johnston ................ G06Q 30/01 |
| 2009/0097634 | A1 | 4/2009 | Nambiar et al. |
| 2021/0027772 | A1 | 1/2021 | Horev et al. |
| 2021/0201238 | A1 | 7/2021 | Sekar et al. |

OTHER PUBLICATIONS

Allahyari, et al., "Text Summarization Techniques: A Brief Survey", Computing Research Repository, 2017, arXiv:1707.02268v3, 9 pages.
Biswas, et al., "Extractive Summarization of Call Transcripts", AI & Data Science, Global Network and Technology, Verizon Communications, New Jersey, USA, 2020, 10 pages.
Blei, et al., "Latent Dirichlet Allocation", The Journal of Machine Learning Research 3, 2003, pp. 993-1022.
Bookstein, et al., "Detecting Content-Bearing Words by Serial Clustering—Extended Abstract", In Proceedings of the 18th ACM-SIGIR Conference, 1995, pp. 319-327.
Brandow, et al., "Automatic condensation of electronic publications by sentence selection", Information Processing and Management, vol. 31, Issue 5, Sep. 1995, 8 pages.
Cer, et al., "Universal Sentence Encoder", Computing Research Repository, 2018, arXiv: 1803.11175v2, 7 pages.
Chen, et al., "An approach to sentence-selection-based text summarization", 2002 IEEE Region 10 Conference on computers, Communications, Control and Power Engineering. TENCOM '02. Proceedings., Beijing, China, vol. 1, 2002, pp. 489-493.
Conroy, et al., "Text summarization via hidden markov models", Proceedings of the 24th annual international ACM SIGIR conference on Research and development in information retrieval, Sep. 2001, pp. 406-407.
Deerwester, et al., "Indexing by Latent Semantic Analysis", Journal of the American Society for Information Science, vol. 41, Issue 6, 1990, pp. 391-407.
Devlin, "BERT: Pre-training of Deep Bi-Directional Transformers for Language Understanding", Computing Research Repository, May 24, 2019, arXiv: 1810.04805v2, 16 pages.
Edmundson, "New Methods in Automatic Extracting", Journal of the Association for Computing Machinery, vol. 16, No. 2, Apr. 1969, pp. 264-285.
Erkan, et al., "LexRank: Graph-based Lexical Centrality as Salience in Text Summarization", Journal of Artificial Intelligence Research, vol. 22, 2004, pp. 457-479.
Fattah, et al., "Automatic Text Summarization", International Journal of Electrical and Computer Engineering, Feb. 2008, pp. 25-28.
Gaikwad, et al., "A Review Paper on Text Summarization", International Journal of Advanced Research in Computer and Communication Engineering, vol. 5, Issue 3, 2016, pp. 154-160.
Gong, et al., "Generic text summarization using relevance measure and latent semantic analysis", SIGIR '01: Proceedings of the 24th Annual International ACM SIGIR Conference on Research and Development in Information Retrieval, Sep. 2001, pp. 19-25.
Gupta, et al., "A Survey of Text Summarization Extractive Techniques", Journal of Emerging Technologies in Web Intelligence, vol. 2, No. 3, Aug. 2010, pp. 258-268.
Jezek, et al., "Automatic Text Summarization (The state of the art 2007 and new challenges)", Vaclav Snasel (Ed.): Znalosti 2008, pp. 1-12.
Jones, "Automatic summarizing: The state of the art", Information Processing & Management, vol. 43, No. 6, 2007, 52 pages.
Kaikhah, et al., "Automatic Text Summarization with Neural Networks", in Proceedings of Second International Conference on Intelligent Systems, IEEE, 2004, Texas, USA, pp. 40-44.
Khan, et al., "A Review on Abstractive Summarization Methods", Journal of Theoretical and Applied Information Technology, 2014, vol. 59, No. 1, pp. 64-72.
Kupiec, et al., "A Trainable Document Summarizer", in Proceedings of the 18th ACMSIGIR Conference, 1995, pp. 58-73.
Lemberger, et al., "Deep Learning Models for Automatic Summarization", Computing Research Repository, May 2020, 13 pages.
Lin, et al., "Abstractive Summarization: A Survey of the State of the Art", in the Proceedings of the AAAI Conference on Artificial Intelligence, 2019, 8 pages.
Lin, et al., "ROUGE: A Package for Automatic Evaluation of Summaries", in Text Summarization Branches Out: Proceedings of the ACL-04 Workshop, 2004, pp. 74-81.
Liu, et al., "Fine-tune BERT for Extractive Summarization", Computing Research Repository, Sep. 2019, 6 pages.
Liu, et al., "Text Summarization with Pretrained Encoders", in proceedings of EMNLP-IJCNLP, Sep. 2019, pp. 3730-3740.
Luhn, "The Automatic Creation of Literature Abstracts", IBM Journal of Research and Development, vol. 2, No. 2, 1958, pp. 159-165.
Miller, "BERT Extractive Summarizer", pypi v0.7.1, Licensed by MIT, 2021, [retrieved from https://pypi.org/project/bert-extractive-summarizer/].
Miller, "Leveraging BERT for Extractive Text Summarization on Lectures", Computing Research Repository, 2019, 7 pages.
Mittendorf, "Document and Passage Retrieval Based on Hidden Markov Models", SIGIR '94: Proceedings of the 17th Annual International ACM SIGIR Conference on Research and Development in Information Retrieval, Aug. 1994, pp. 318-327.
Nallapati, et al., "Abstractive Text Summarization using Sequence-to-sequence RNNs and Beyond", in Proceedings of the 20th SIGNLL Conference on Computational Natural Language Learning, Berlin, Germany, 2016, pp. 280-290.
Nallapati, et al., "SummaRuNNer: A Recurrent Neural Network based Sequence Model for Extractive Summarization of Documents", in Proceedings of the 31st AAAI Conference on Artificial Intelligence. San Francisco, CA, USA, 2016, pp. 3075-3081.
Narayan, et al., "Ranking Sentences for Extractive Summarization with Reinforcement Learning", in Proceedings of NAACL-HLT, 2018, pp. 1747-1759.
Nenkova, "A Survey of Text Summarization Techniques", Mining Text Data, Springer, 2012, pp. 43-76.
Neto, "Automatic Text Summarization using a Machine Learning Approach", Advances in Artificial Intelligence: Lecture Notes in Computer Science, Springer Berlin/Heidelberg, vol. 2507, 2002, pp. 205-215.
Paulus, et al., "A Deep Reinforced Model for Abstractive Summarization", arXiv:1705.04304v3 [cs.CL] Nov. 13, 2017, 12 pages.
Radev, "Introduction to the Special Issue on Summarization", Association for Computational Linguistics, vol. 28, No. 4, 2002, pp. 399-408.
Reeve, "Concept Frequency Distribution in Biomedical Text Summarization", ACM 15th Conference on Information and Knowledge Management (CIKM), Arlington, VA, 2006, 10 pages.
Rumelhart, et al., "Learning representations by back-propagating errors", Nature, vol. 323, No. 9, Oct. 1986, pp. 533-536.
Saggion, et al., "Automatic Text Summarization: Past, Present and Future", Multi-source, Multilingual Information Extraction and Summarization. Springer, 2013, 20 pages.
Saranyamol, "A Survey on Automatic Text Summarization", International Journal of Computer Science and Information Technologies, vol. 5, Issue 6, 2014, pp. 7889-7893.
See, et al., "Get to the Point: Summarization with Pointer-Generator Networks", Computing Research Repository, 2017, 20 pages.

(56) References Cited

OTHER PUBLICATIONS

Steyvers, et al., "Probabilistic Topic Models", Handbook of Latent Semantic Analysis, 2007, pp. 424-440.
Suanmali, et al., "Fuzzy logic based method for improved text summarization", {IJCSIS) International Journal of Computer Science and Information Security, vol. 2, No. 1, 2009, 6 pages.
Vaswani, et al., "Attention Is All You Need", 31st Conference on Neural Information Processing Systems (NIPS 2017), Long Beach, CA, 15 pages.
Verma, et al., "Extractive Summarization using Deep Learning", Computing Research Repository, 2019, 11 pages.
Wang, et al., "Multi-Document Summarization using Sentence-based Topic Models", in Proceedings of the ACL-IJCNLP Conference Short Papers, Suntec, Singapore, 2009, pp. 297-300.
Wu, et al., "Extracting Summary Knowledge Graphs from Long Documents", Computing Research Repository, 2020, 8 pages.
Xu, et al., "Neural Extractive Text Summarization with Syntactic Compression", in proceedings of EMNLP-IJCNLP, 2019, pp. 3292-3303.
Zechner, "A Literature Survey on Information Extraction and Text Summarization", Computational Linguistics Program, Carnegie Mellon University, Apr. 14, 1997, 31 pages.

\* cited by examiner

Agent text summary:

"My name is mary. If anything happens. What happens with the box. Basically, if anything's the signal come across on that frequency on there, it gets really bad will give you that currently unavailable message. Um six collects cables. You wouldn't be. Give me one moment so got a to see the start locations in wanna. You know. Yes, i can do. You want to start telephone number. Give me one moment. Does it to they. Replacement boxes, get sent out next, get it tomorrow. Give me one moment technically triple play, except screens address. And let's say you know, i just had an aol dot com. It give me one. I agree. 'Cause normally I actually see one. Sometimes i sound like something my name's mary. Sometimes it's mari. Unfortunately, i'm i was. If anything happens, i have your information rain. 'Cause. They just 'cause. You know. Basically, you can just keep the cables. Any other questions anything else. I can help you today, i'm not a promise."

Fig. 5

630 — "My name is mary. If anything happens. What happens with the box. Basically, if anything's the signal come across on that frequency on there, it gets really bad will give you that currently unavailable message. Um six collects cables. You wouldn't be. Give me one moment so got a to see the start locations in wanna. You know. Yes, i can do. You want to start telephone number. Give me one moment. Does it to they. Replacement boxes, get sent out next, get it tomorrow. Give me one moment technically triple play, except screens address. And let's say you know, i just had an aol dot com. It give me one. I agree. 'Cause normally I actually see one. Sometimes i sound like something my name's mary. Sometimes it's mari. Unfortunately, i'm i was. If anything happens, i have your information rain. 'Cause. They just 'cause. You know. Basically, you can just keep the cables. Any other questions anything else. I can help you today, i'm not a promise."

640 — I can get this and that was no cost involved too it he gets fixed prior to that or you know, say. Doesn't fix and you have a tech out there. You know. Basically, you can just keep the cables. You don't have to worry about returning anything on on that side of the I'm not a.

Fig. 6B

"My name is mary. If anything happens. What happens with the box. Basically, if anything's the signal come across on that frequency on there, it gets really bad will give you that currently unavailable message. Um six collects cables. You wouldn't be. Give me one moment so got a to see the start locations in wanna. You know. Yes, i can do. You want to start telephone number. Give me one moment. Does it to they. Replacement boxes, get sent out next, get it tomorrow. Give me one moment technically triple play, except screens address. And let's say you know, i just had an aol dot com. It give me one. I agree. 'Cause normally I actually see one. Sometimes i sound like something my name's mary. Sometimes it's mari. Unfortunately, i'm i was. If anything happens, i have your information rain. 'Cause. They just 'cause. You know. Basically, you can just keep the cables. Any other questions anything else. I can help you today, i'm not a promise."

650

I can get this and that was no cost involved too it he gets fixed prior to that or you know, say. Doesn't fix and you have a tech out there. You know. Basically, you can just keep the cables. You don't have to worry about returning anything on on that side of the I'm not a.

"My name is mary. If anything happens. Basically, if anything's the signal come across on that frequency on there, it gets really bad will give you that currently unavailable message. Um six collects cables. You wouldn't be. Give me one moment so got a to see the start locations in wanna. You know. Yes, i can do. You want to start telephone number. Give me one moment. Does it to they. Replacement boxes, get sent out next, get it tomorrow. Give me one moment technically triple play, except screens address. And let's say you know, i just had an aol dot com. It give me one. I agree. 'Cause normally I actually see one. Sometimes i sound like something my name's mary. Sometimes it's mari. Unfortunately, i'm i was. If anything happens, i have your information rain. 'Cause. They just 'cause. You know. Basically, you can just keep the cables. Any other questions anything else. I can help you today, i'm not a promise."

I just don't wanna waste time waiting for another box to come and find out something else.

What happens with the box.

If you want never replaced box sent, I can send a replacement box next to I can also. If you want to get this for a tech to go out there.

I have no problem with replacing the box.

I just don't wanna waste time waiting for another box to come and find out something else.

What happens with the box.

If you want never replaced box sent, I can send a replacement box next to i can also. if you want to get this for a tech to go out there.

I can get this setup for a tech to go out there if the determine the box needs ot be replacing your can replace that when the're out the only thing i would have to advise that they determine there's something going on with the cabling on the other tech would actuall like you know, 'case.

What happens with the box.

"My name is mary. If anything happens. Basically, if anything's the signal come across on that frequency on there, it gets really bad will give you that currently unavailable message. Um six collects cables. You wouldn't be. Give me one moment so got a to see the start locations in wanna. You know. Yes, i can do. You want to start telephone number. Give me one moment. Does it to they. Replacement boxes, get sent out next, get it tomorrow. Give me one moment technically triple play, except screens address. And let's say you know, i just had an aol dot com. It give me one. I agree. 'Cause normally I actually see one. Sometimes i sound like something my name's mary. Sometimes it's mari. Unfortunately, i'm i was. If anything happens, i have your information rain. 'Cause. They just 'cause. You know. Basically, you can just keep the cables. Any other questions anything else. I can help you today, i'm not a promise."

Fig. 6E

METHOD AND APPARATUS FOR SUMMARIZATION OF DIALOGS

CROSS REFERENCE TO RELATED APPLICATIONS

This application is a continuation of application Ser. No. 16/939,800 entitled "METHOD AND APPARATUS FOR SUMMARIZATION OF DIALOGS," filed Jul. 27, 2020, the contents of which are hereby incorporated herein by reference in their entirety.

BACKGROUND INFORMATION

Businesses and other types of organizations often operate customer service centers for handling customers' requests for descriptions of and/or issue resolution regarding products, services, features and offerings, equipment setup and installation, performance issues, technical support, and/or other information (e.g., billing, etc.). Interactions with a customer can involve a customer service representative (CSR) exchanging a dialog with the customer to provide assistance with new or existing services. An audio recording of the dialog may be made, and translated to text to produce transcripts for subsequent use. However, transcripts of such dialogs can be lengthy and difficult to read, particularly if multiple CSRs are involved in assisting the customer over time.

BRIEF DESCRIPTION OF THE DRAWINGS

FIG. 5 is a drawing showing an exemplary agent summary paragraph having keywords annotated with highlighting; and FIGS. 6A-E are drawings illustrating examples of various interfaces for interacting with summary paragraphs according to an embodiment.

DETAILED DESCRIPTION OF PREFERRED EMBODIMENTS

Figure 1:
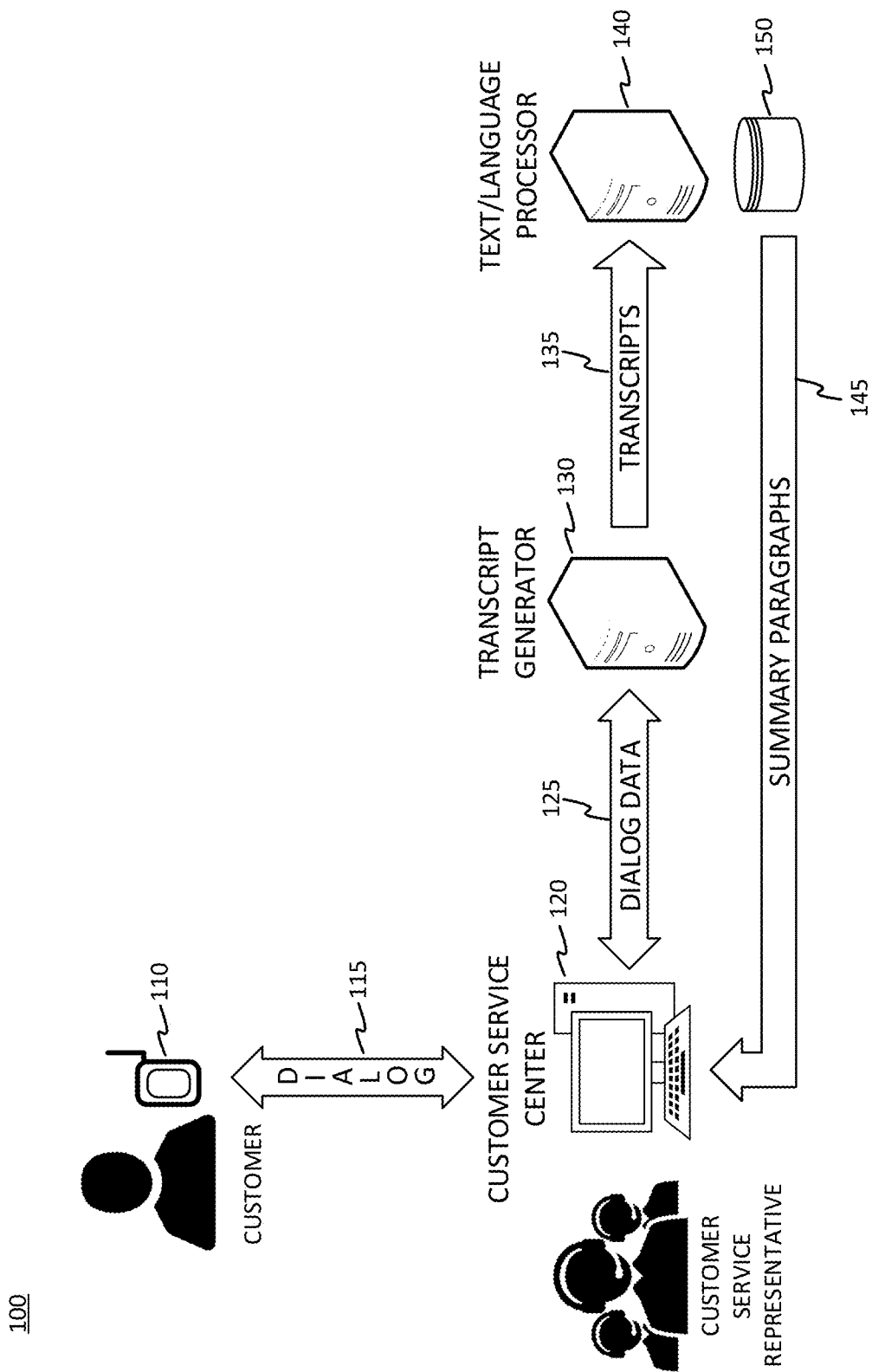
FIG. 1 is a diagram illustrating an exemplary environment associated with a customer service center using dialog summarization according to an embodiment.

The following detailed description refers to the accompanying drawings. The same reference numbers in different drawings identify the same or similar elements. The following detailed description does not limit the invention, which is defined by the claims.

For purposes of description, an end user may be referred to herein as a "customer" which is not intended to limit embodiments according to this disclosure to an end user being bound within a traditional definition of a "customer." Accordingly, the term "user device" may be referred to interchangeably with the term "customer device." Description of a live customer service representative (CSR), also referred to herein as a "service agent" or simply "agent," may presume a communications device that can include a display proximal to the service agent which typically, but not necessarily, may be associated with a customer service center (CSC). As used herein, the term "call" may be generalized to any type of interactive communication between the customer and the service agent, that may include, for example, voice, video, and/or text communications. Additionally or alternatively, embodiments may include other non-interactive communications between the customer and the service agent.

CSCs may receive many thousands of calls from customers seeking resolution of issues which may relate to products, services, features and offerings, promotions, equipment setup and installation, performance issues, technical support, billing, etc. During each call an agent tries to identify the cause of customer's complaint and to resolve the problem. Agents may write down important points on a piece of paper as the call proceeds. At the end of the call, agents may consult the paper notes and summarize their customer conversation on a desktop application executing on a computer. In some instances, various details of the conversation get omitted or forgotten, particularly when a conversation flow keeps changing and when the conversation lasts for a long time. One partial remedy to this address problem is to leverage the audio recording of each conversation and transcripts generated from those recordings. However, for most of the calls neither the audio recordings nor the transcripts are being reviewed by the agents. Both the recordings and transcripts can be very lengthy, and the transcripts have no punctuation, hence to the reader, each transcript looks like a stream of words and thus is difficult to parse. Moreover, the transcripts may have a word error rate that often can reach 40% and higher. Extracting information relevant for each conversation may be challenging given the scope of issues addressed by agents. Relevant information to extract may include, for example, technical problems discussed, promises made to the customer, customer sentiment during the call, etc.

Accordingly, embodiments herein are directed to automatically generating summaries of dialogs between agents and customers to facilitate technical support services. The summaries may identify key words and key phrases to ease the identification of topics and what promises were extended to the customer during the call. In some embodiments, a graphical interface may highlight the identified key words and phrases in various ways. The agent may interact with the summary to obtain more context from the dialogs and determine when various issues were discussed during the customer support call. The generated summaries obviate the need for a CSR to read a long and intractable stream of words. Having the relevant information not only leads to higher customer satisfaction and helps to retain valuable customers, it also reduces the call holding time if subsequent calls are needed, as the next (likely a different) agent may be able quickly review the summary of what had been previously discussed without the customer having to reiterate the description of the technical issue.

FIG. 1 is a diagram illustrating an exemplary environment associated with a customer service center using dialog summarization according to an embodiment. Environment 100 may include a user device 110, a device 120 associated with a customer service center (CSC) (hereinafter "CSC device 120"), a transcript generator 130 associated with a transcript service, and a text/language processor 140 with a storage device 150 associated with a natural language processing (NLP) service. A customer may use user device 110 to contact CSC device 120 (e.g., communications represented by arrow 115). Over the course of the help session, the audio representing the dialog between the CSR (i.e., agent) and the customer may be recorded by CSC device 120. CSC device 120 may forward the dialog data 125 to transcript generator 130. From dialog data 125, transcript generator 130 may create text data to generate transcripts 135 that represent dialog data 125 in the form of "text streams" of both the agent and the customer. Specifically, the text of dialog data 125 in transcripts 135 associated with the customer may be referred to herein as an "customer text stream." The text of dialog data 125 in transcripts 135 associated with the agent may referred to herein as an "agent text stream." Transcripts 135 may be stored in a file using any format, such as, for example, ASCII text, binary, compressed, and/or encrypted, etc.

Further to FIG. 1, transcript generator 130 may forward the transcripts 135 to text/language processor 140. Text/language processor 140 may operate on received transcripts 135 to perform various natural language tasks, such as, for example, segmentation (e.g., applying punctuation), topic modeling, promise determination, sentiment analysis and summarization of dialog. In an embodiment, text/language processor 140 may generate summary paragraphs 145 that, may be annotated with keywords, and split into multiple paragraphs corresponding to an agent summary paragraph and/or a customer summary paragraph. The summary paragraphs may be produced, for example, using an extractive summarization approach which can be based on determining terms of interest belonging to distinct subject classes, and assigning frequency related weights to emphasize the terms of interest in received transcripts 135. The frequency related weights associated with the terms of interest may subsequently be used to determine weights of sentences in received transcripts 135. The summary paragraph may be generated using sentences extracted from received transcripts 135 based on the aforementioned weights of sentences.

Summary paragraphs 145 may be provided back to CSC device 120 for use by CSR in assisting customers and/or for saved to create of record of the customer service sessions. Text/language processor 140 may include an NLP engine for performing various natural language tasks. For example, topic modeling, promises determination, and/or sentiment analysis can be well-suited for operations by an NLP engine. To avoid high computational requirements of NLP, an embodiment may rely on outsourced natural language understanding (NLU) for customer inputs to vendor-based NLP engines.

Figure 2:
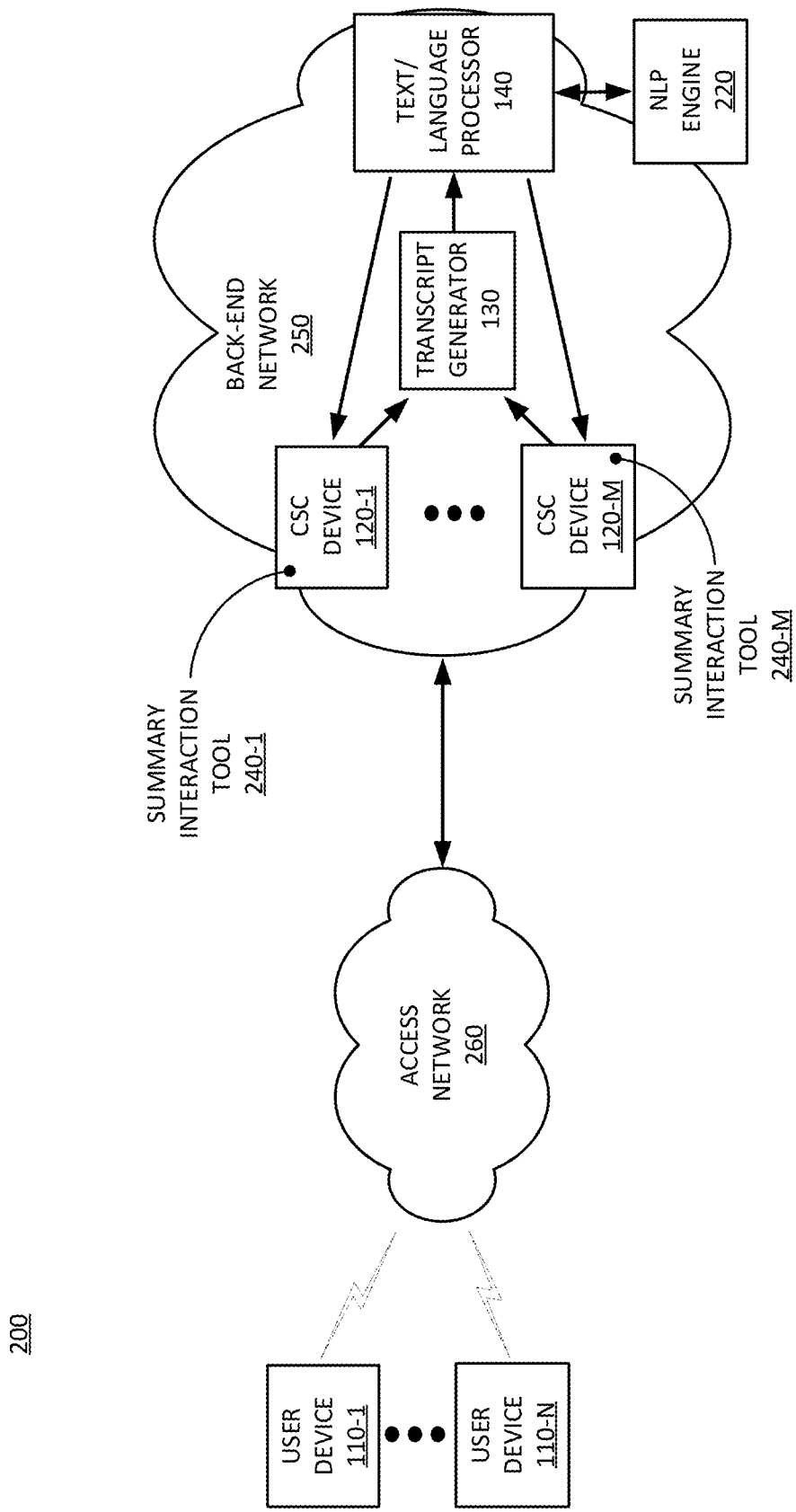
FIG. 2 is a diagram illustrating an exemplary networking environment including a device performing dialog summarization according to an embodiment.

FIG. 2 illustrates an example networking environment in which systems and/or methods for summarizing dialogs may be embodied. As shown in FIG. 2, environment 200 may include user devices 110-1 through 110-N, CSC device 120-1 through 120-M, transcript generator 130, text/language processor 140, NLP engine 220, summary interaction tool 240-1 through 240-M, back-end network 250, and access network 260.

Text/language processor 140 may reside in back-end network 250, and be functionally coupled to CSC devices 120, transcript generator 130, and NLP engine 220. In an embodiment, transcript generator 130 and NLP engine 220 may both reside in back-end network 250 as shown in FIG. 2. In an alternative embodiment, transcript generator 130 and/or NLP engine 220 may reside in another network external to back-end network 250 (not shown), and be associated with one or more external service providers. In this alternative embodiment, transcript generator 130 and/or NLP engine 220 may communicate with backend network 250 through access network 260 or another network not shown in FIG. 2. Further referring to FIG. 2, transcript generator 130 may be functionally coupled to CSC devices 120 within back-end network 250. Back-end network 250 may exchange data with access network 260 to communicate with user devices 110. User devices 110 may be wireless devices (e.g., mobile devices) and may exchange data wirelessly with access network 260.

Further referring to FIG. 2, transcript generator 130 may receive from CSC devices 120 digital audio recordings of dialogs between agents and customers. Each dialog may be generated from the data exchanged, via access network 260, between user device 110 and CSC device 120 during a conversation occurring for a tech support call. The dialog data, which includes the digitized voices of the agent and the customer, may be provided to transcript generator 130 to generate text data of the dialog. The text data may include the combined text streams of both the agent and the customer. The text data may be provided to text/language processor 140, which may separate the text data from an agent text stream and a customer text stream. Text/language processor 140, in conjunction with NLP engine 220, may further segment the agent text stream and customer text stream into sentences, and perform further processing to reduce each segmented text stream into summary paragraphs. Text/language processor 140 may then identify keywords in each summary paragraph and provide the paragraphs to CSC devices 120. Through CSC devices 120, agents may interact with the summary paragraphs using the summary interaction tool 240 based on the identified keywords.

User device 110 may include a device capable of communicating via a network, such as access network 260. For example, user device 110 may correspond to a mobile communication device (e.g., a smartphone, or a personal digital assistant (PDA)), a portable computer device (e.g., a laptop computer, a tablet computer, a wearable computer), and/or another type of device. In some implementations, user device 110 may include a client-side application to interact with agents during, for example, a "help desk" session through CSC device 120 via text, voice, video, and/or image data.

CSC device 120 may include a device capable of communicating via a network, such as back-end network 250 and/or access network 260. For example, CSC device 120 may include one or more computing devices, such as a laptop computer, a desktop computer, a tablet computer, etc. CSC device 120 may be used by an individual within an organization, such as an agent within a CSC. In an embodiment, CSC device 120 may provide an agent with access to summary interaction tool 240 which may allow an agent to interact with summary paragraphs. For example, summary interaction tool 240 can provide a graphical user interface allowing an agent to interact with agent summary paragraphs and/or customer summary paragraphs. Summary interaction tool 240 may accept standard mouse commands for controlling the cursor and selection objects and text (e.g., clicks, double-clicks, drags, selections, etc.). Summary interaction tool 240 may also accept keyboard commands issued by the agent, which may include, for example, standard key-strokes and/or shortcuts issued using command, shift, and/or control key combinations. Exemplary interfaces which may be provided to an on a display of CSC device 120 are described below in reference to FIGS. 5 though 6E.

Transcript generator 130 may include any device capable of exchanging data via a network, such a, for example, back-end network 250. For example, transcript generator 130 may be implemented in one or more computing devices, and can include a personal computer, a server, mainframe, etc. In an embodiment, transcript generator 130 may be under the control of a third party service provider, and transcripts for use by text/language processor 140 may be generated as a service.

Text/language processor 140 may include any device capable of exchanging data via a network, such as, for example, back-end network 250. Text/language processor 140 may be implemented on one or more computing devices, such as a desktop computer, server, a mainframe, etc. Text/language processor 140 may concurrently receive a plurality of transcripts from transcript generator 130, perform various text modelling task, such as, for example, topic modeling, promise determination, sentiment analysis, and/or summarization. Transcript generator 130 may provide various results, including summary paragraphs, to multiple CSC devices 120 in a concurrent manner.

NLP engine 220 may include any device capable of communicating via a network, such as, for example, back-end network 250. NLP engine 220 be implemented on one or more computing devices, such as a desktop computer, server, a mainframe, etc. NLP engine 220 may be an artificial intelligence (AI) based third-party vendor service, for example, IBM Watson™, Amazon Lex™, or Google Dialogflow™, capable of processing data from a dialog session between a user of user device 110 and an agent of CSC device 120. NLP engine 220 may analyze the dialog data and detect topics, promises, and/or sentiments associated with the customer dialog session. NLP engine 220 may provide the analysis of the dialog session to text/language processor 140.

Back-end network 250 may be a secure network providing a private connection space between network devices to communicate/share network traffic. Back-end network 250 may include a local area network (LAN) and/or a wide area network (WAN), an intranet, or any combination of networks. Some or all of back-end network 250 may be managed by a provider of communication services that also manages access network 260 and CSC devices 120. Back-end network 250 may allow the delivery of IP and/or non-IP services between network devices residing therein, and also to user devices 110 via access network 260. Back-end network may interface with other external networks, such as, for example, the internet. Back-end network 250 may include an IP Multimedia Sub-system (IMS) network (not shown in FIG. 2). An IMS network may include a network for delivering IP multimedia services and may provide media flows between user devices 110 and external IP networks or external circuit-switched networks (not shown in FIG. 2).

Access network 260 may include a wireless radio access network for exchanging data with user devices 110. For example, access network 260 may include a fourth generation (4G) wireless network which may, for example, utilize the Long Term Evolution (LTE) standard and thus include an evolved packet core (EPC) network. Additionally or alternatively, access network 260 may include an LTE Advanced (LTE-A) access network and/or a fifth generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (Het-Nets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. In other implementations, access networks 260 may include a Code Division Multiple Access (CDMA) access network. For example, the CDMA access network may include a CDMA enhanced High Rate Packet Data (eHRPD) network (which may provide access to an LTE network).

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
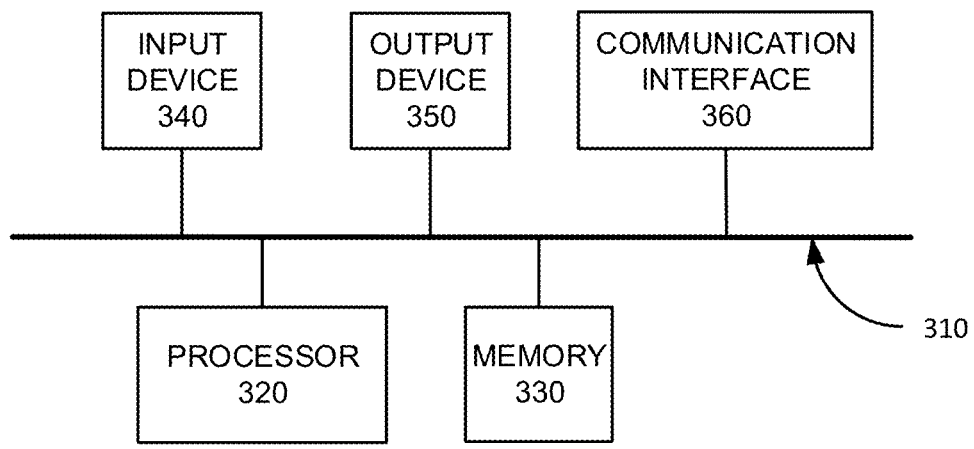
FIG. 3 is a block diagram illustrating exemplary components of a device according to an embodiment.

FIG. 3 is a diagram illustrating example components of a device 300 according to an embodiment. User device 110, CSC device 120, text/language processor 140, and/or NLP engine 220 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

In some embodiments, additional processors (not shown) such as, for example, artificial intelligence (AI) accelerators, neural net accelerators, etc., may be included to facilitate the operation of various AI applications and/or processes, such as, for example, neural net training and/or operation, natural language processing functionality including, for example, topic modeling, promise determination (e.g., determining if promises were made by the agent to the customer), sentiment analysis, summarization, etc.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, a solid state drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340.

In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Device 300 may perform operations directed to summarizing dialogs between the customers and the agents. Device 300, which may, in a single unit or separately, correspond to CSC device 120 and/or text/language processor 140. Device 300 may perform these operations in response to processor 320 executing software instructions contained in a computer-readable medium, such as memory 330. For example, memory 330 may store instructions corresponding to summary interaction tool 240, where upon execution by processor 320, device 300 (e.g., CSC 120) provides a user interface to an agent for interacting with summary paragraphs, as will be described below in reference to FIG. 4. In another example, either within the same or a separate and distinct device 300, instructions in memory may cause device 300 (e.g., text/language processor 140) to process agent text stream and/or customer text stream to: apply punctuation to generate sentences; perform indexing on each sentence, generate separate summaries corresponding to agent and the customer text streams, and identify key words in the summary paragraphs.

In an embodiment, a computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
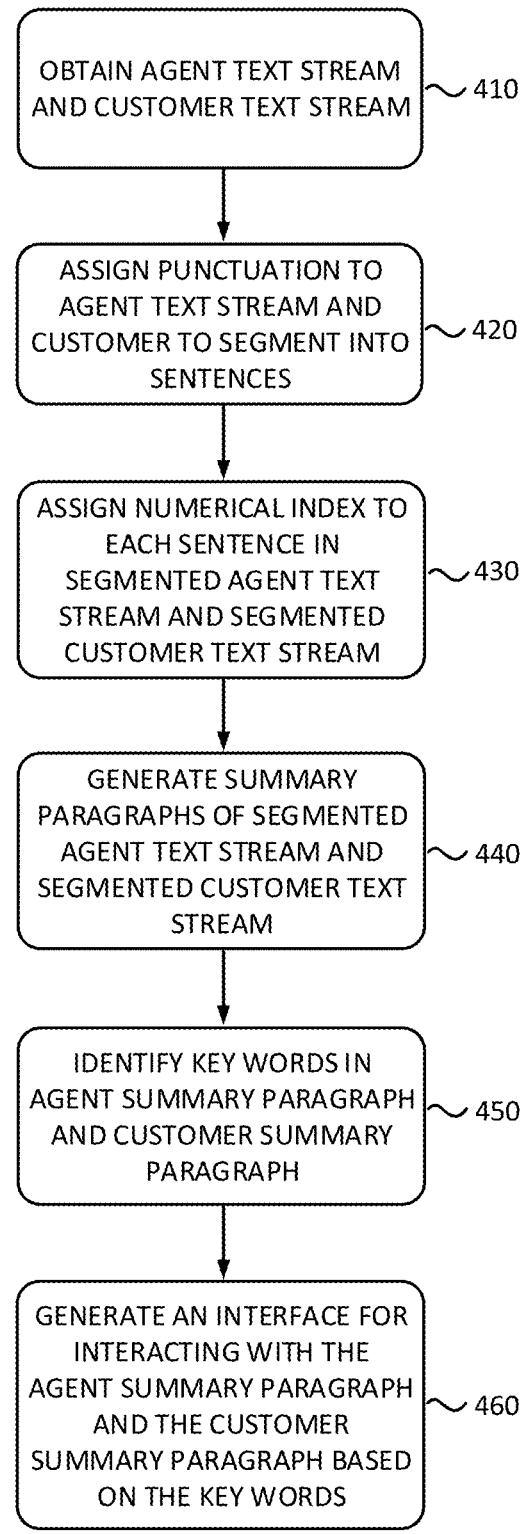
FIG. 4 is a flowchart showing a process for providing summarization of dialogs according to an embodiment.

FIG. 4 is a flow chart illustrating an exemplary process 400 consistent with an embodiment. Process 400 may be performed by device 300, where one or more processor(s) 320 may execute instructions stored in memory/memories 330 for summarizing dialogs and permitting agent interaction with summary paragraphs. Process 400 may be performed by one or more devices 300, which can be associated with CSC device 120, text/language processor 140, and/or NLP engine 220.

Processor 320 may obtain an agent text stream and a customer text stream (Block 410). In an embodiment, obtaining the agent text stream and/or the customer text stream may include processor 320 receiving a transcript of a dialog between the agent and the customer, identifying a first text stream within the transcript associated with the agent, and identifying a second text stream within the transcript associated with the customer. The transcript may be derived from an audio recording of the conversation between the agent and the customer. In an embodiment, the transcript of the dialog may separate the words spoken by each party into alternating channels (e.g., an agent channel and a customer channel). The received transcript may be a very long stream of words that can be difficult to read. The transcript may be generated by transcript generator 130, which may be operated and/or under the control of a third party service/contractor.

In an embodiment, processor 320 may identify a first text stream within the transcript associated with the agent (referred to herein as "agent text stream" which corresponds to an "agent channel"), and identify a second text stream within the transcript associated with the customer (referred to herein as "customer text stream" which corresponds to a "customer channel"). If other parties are present (additional customers, agents, etc.), these parties may be assigned to their own particular text stream and channels. In practice, agent text stream and/or customer text stream may be a long and difficult to read string of words. Each text steam may go on for multiple pages and include high word error rates. The identification of text streams may be performed with the assistance of NLP engine 220, and could be based on the recognition of specific words and/or phrases.

Processor 320 may segment the agent text stream and customer text stream into sentences (Block 420). In an embodiment, segmenting the agent text stream and customer text stream into sentences may include assigning punctuation to the first text stream and the second text stream using a deep neural network model, where the deep neural network model may include, for example, a convolutional neural network model, a bidirectional long term memory model with attention, and/or one or more transformer models. Types of transformer models may include, for example, a bidirectional encoder representations from transformers (BERT), a lite BERT (ALBERT), robustly optimized (RoBert), and/or embeddings from language models (ElMo). One type of transformer model, or a combination thereof, may be used in Block 420 for segmenting text streams into sentences. In an embodiment, any combination of transformer models may be used to segment text streams into sentences in Block 420. Accordingly, in Block 420, processor 320 produces a segmented agent text stream and a segmented customer text stream, each consisting of sentences having punctuation.

Processor 320 may label sentences associated with the segmented agent text stream and the segmented customer text stream (Block 430). In an embodiment, process 320 may label sentences by assigning a numerical index to each sentence in the segmented agent text stream, and assigning a numerical index to each sentence in the segmented customer text stream. For example, a sentence with index N in the segmented agent text stream may be denoted by SA(N); a sentence with index N in the segmented customer text stream may be denoted by SC(N). For example, in the segmented agent text stream, SA(0) may be the first sentence, SA(1) may be the second sentence, and so on. The segmented customer text stream may be similarly indexed.

Processor 320 may generate an agent summary paragraph based on the segmented agent text stream, and a customer summary paragraph based on the segmented customer text stream (Block 440). In an embodiment, generating summary paragraphs may include processor 320 extracting sentences from the agent text stream and/or the customer text stream based on frequencies of words in each text stream, and/or terms of interest in each text stream. Processor 320 may generate an agent summary paragraph based on the extracted sentences from the agent text stream. Processor 320 may generate a customer summary paragraph based on the extracted sentences from the customer text stream. The agent summary paragraph and the customer summary paragraph produced by processor 320 in Block 440 are reduced in size from the segmented agent text stream and the segmented customer text stream, respectively, and are thus easier for an agent to read and understand. In an embodiment, a summary paragraph may have a length of approximately 150-200 words. In an embodiment, processor 320 may apply a summarization model to the segmented agent text stream and the segmented customer text stream, where the summarization model includes at least one of extractive summarization based on a natural language tool kit (NLTK) package, or an abstractive summarization based on a transformer model.

For example, an extractive summarization can be generated, for example, by determining terms of interest belonging to distinct subject classes, and assigning frequency related weights to each word in a segmented text stream. The particular weights may be assigned to emphasize words that are the terms of interest in the segmented text stream. In an example, subject matter classes may correspond to technical subjects, negative sentiments, promises, etc.

More specifically, in an embodiment, processor 320 may perform an extractive summarization by splitting words associated with vocabularies into a plurality of subsets, where each subset from the plurality of subsets may be associated with a distinct subject matter class. An exemplary subset may include "special words" of interest associated with a customer service context (e.g., "WiFi," "router," "connection," etc.). Other words frequently found in customer service dialogs, such as, for example "hello," "day," "home,", etc. may not be included in the aforementioned exemplary subset.

Processor 320 may assign weights to words corresponding to a frequency of an appearance of the words in the segmented text stream, where the assigned weights include particular weights to emphasize words associated with each subset. Weights may be represented by numerical values, and particular weighs may be given larger values to emphasize words of interest. For example, a weight $W_f$ may be assigned to a word corresponding to its frequency f of appearance in the text. Processor 320 may assign weights in a manner where the aforementioned special words (e.g., "WiFi," "router," "connection," etc.) are assigned larger values (e.g., we add W=20 to its frequency based weight: $W_f=W_f+W=W_f+20$). In an embodiment, the value of W can be fine-tuned to improve the accuracy of the summary paragraph.

Once the weights are specified, processor 320 may assign weights of sentences based on the assigned weights to words. For example, each sentence weight may be the average of the word weights determined for the words from that sentence. For example, if the sentence is "HAVE A NICE DAY," with word weights 1, 5, 4, and 2, then the sentence's weight may be determined as (1+5+4+2)/4=3. Alternative calculation of sentence weights can be done when by dropping (not using in the calculation) all stop words such as 'A', etc. In such a case, the sentence's weight would be (1+4+2)/3=2.33.

Processor 320 may select a predetermined number of sentences based on the assigned weights to words. For example, N (N being an integer) sentences having the highest weights may be selected, and then listed in chronological order to generate the summary paragraph. Processor 320 may then list the selected sentences in an order to generate the summary paragraph. For example, the order may correspond to a "chronological" order according to when the sentences appeared in the paragraph. Specifically, suppose that N=5 and the following sentences have the highest weights: S(20), S(75), S(2), S(3), S(34). The summary paragraph may be constructed as follows: S(2). S(3). S(20). S(34). S(75).

Referring again to FIG. 4, processor 320 may identify keywords associated with each of the agent summary paragraph and the customer summary paragraph (Block 450). In an embodiment, processor 320 may find keywords relevant to topics of interest, where, for example, topics of interest may include technical information regarding equipment and/or services associated with customer. Processor 320 may identify keywords by matching words within summary paragraphs with sets of predefined words. The determination of the set predefined words may be driven by the content of the help session. For example, if the CSC 120 is set up for assisting customers with optical networking issues, sets of predefined keywords based on optical networking hardware and/or software, information of interest, and/or prior experience with customer service issues (e.g., keywords associated with problems commonly encountered by customers). Once keywords have been matched, the keywords may be annotated in a display of the summary paragraphs for assisting the agent in reading and/or scanning the agent summary paragraph and/or the customer summary paragraph. In various embodiments, the annotation may be accomplished using font size, underlining, font style, font color, background color, highlighting, and/or animations (blinking, changing font size, font color, font type, adding graphics to the text, etc.) As used herein, "highlighting" annotates a word by overlaying the word with a surrounding color in a manner which allows the highlighted word to remain legible. As described in reference to FIG. 5, embodiments may annotate keywords with highlighting to quickly draw the attention of the agent to the keywords.

FIG. 5 shows an exemplary display of an agent summary paragraph 510 having keywords annotated with highlighting. Additionally or alternatively, different forms of styling may be applied to the text. For example, variations in text style, color, size, line weight, font type, underlining, kerning, etc. may be applied. In some embodiments, font animation may be used (e.g., dynamic variations in text including blinking, size changes, color changes, kerning changes, background variations (e.g., highlighting), and/or line thickness changes). In the case of highlights overlaying text as displayed in FIG. 5, the highlighting may be performed using different colors, patterns, and/or shades. In an embodiment shown in FIG. 5, highlighting may be displayed as gray area (e.g., a halftone pattern) overlaid on text. Accordingly, within agent summary paragraph 510, processor 320 found and highlighted key words relevant to various information of interest. For example, processor 320 highlighted the keyword "box" because it is one of the predefined keywords identifying a possible problem with a customer's set top box. As noted above, annotations can include combinations of various font size, underlining, font style, font color, background color, etc. Note that key words relevant to other type of information, such as, for example promises made by the agent, can be highlighted using different combination of font, color, etc. The highlighting allows an agent who is reviewing the summary to easily identify key words of interest.

Referring back to FIG. 4, processor 320 may generate an interface for interacting with the agent summary paragraph and/or the customer summary paragraph based on the identified key words (Block 460). Processor 320 may generate an interface for interacting with summary paragraphs by detecting a selection of a key word in the agent summary paragraph and/or the customer summary paragraph. Processor 320 may identify an index of a sentence in the segmented agent text stream and/or the segmented customer text stream based on the detected selection of the key word. Processor 320 may then display sentences corresponding to a predetermined range of indices from the segmented agent text stream and/or the segmented customer text stream, where the predetermined range of indices bound the identified index.

For example, in agent summary paragraph 510 shown in FIG. 5, if the agent hovers with a mouse cursor over a sentence with the keyword "box" in that sentence, processor 320 may identify the index of the sentence corresponding to the keyword "box" in the associated segmented agent text stream. If the index of the sentence associated with the keyword "box" is N, once the agent selects the keyword "box" in the sentence (e.g., performs a single mouse click on the keyword "box"), processor 320 may display sentences SA(N−1), SA(N), and SA(N+1) from the segmented agent text stream to provide more context around the sentence SA(N).

Figure 6A:
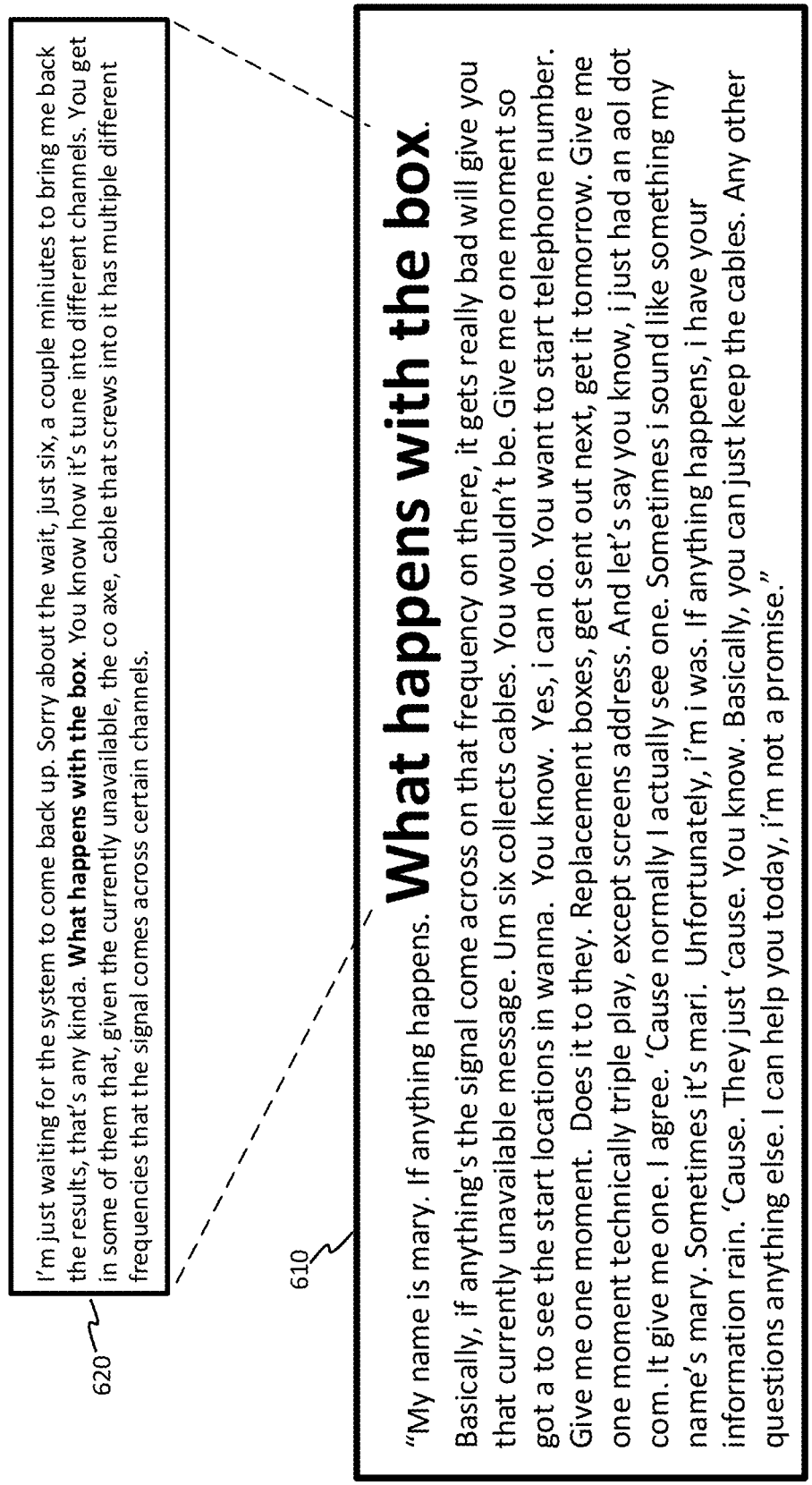

FIG. 6A shows an embodiment which displays a portion of text from a segmented text stream in a sub-window 620, where the portion of text is associated with one or more sentences in summary paragraph 610. When generating the interface to interact with at the agent summary paragraph and/or the customer summary paragraph, processor 320 may detect a selection of a sentence in the agent summary paragraph and/or the customer summary paragraph. Processor 320 may then identify an index of the detected sentence in the segmented agent text stream and/or the segmented customer text stream based on the detected selection of the sentence. Processor 320 may then display neighboring sentences corresponding to a predetermined range of indices from the segmented agent text stream and/or the segmented customer text stream, where the predetermined range of indices bound the identified index associated with the selected sentence. The neighboring sentences of the segmented text stream may be presented in a sub-window 620, which may graphically indicate an association with the detected sentence in the summary paragraph (as shown, for example, using dotted lines in FIG. 6A). In an embodiment, an agent may double click while hovering over the detected sentence in the summary paragraph, and processor 320 may retrieve sentences S(N−2), S(N−1), S(N), S(N+1) S(N+2) from the segmented text stream for display in sub-window 620 to provide additional context associated with a selected sentence S(N) or keyword in sentence S(N).

FIG. 6B shows an embodiment which displays a portion of text from a segmented text stream in a sub-window 640 which is associated with text in summary paragraph 630, where the portion of text displayed is increased if neighboring sentences in a segmented text stream are short. Accordingly, in an embodiment, processor 320 may determine a metric corresponding to lengths of the neighboring sentences in a segmented text stream (e.g., segmented agent text stream and/or segmented customer text stream). Processor may increase a number of the neighboring sentences to display from the segmented text stream upon determining the metric corresponding to the length of the neighboring sentences is below a threshold.

In summary, if the neighboring sentences in a segmented text stream are short (i.e., less than X (e.g. a predetermined threshold, X=5) words in length), the processor 320 may automatically add additional sentences until their cumulative length exceeds desired number (T) of words. For example, as shown in FIG. 6B, an agent hovered over the sentence in summary paragraph 630 at a key phrase "you can just keep the cables" and clicked once. As shown in sub-window 640 in the segmented text stream, the closest sentence to the left, S(N−1), has only two words: "You know", and therefore provides almost no additional information as determined by the processor 320. In that case, processor 320 may retrieve the prior sentence (e.g., to the left in paragraph 630) and will display sentences S(N−2), S(N−1), S(N), S(N+1).

A formula to determine the smallest index K of a sentence to be displayed from the segmented text stream may be expressed as follows:

$$K=\max\{K: K<N \text{ \& length}(S(K)+S(K+1)+\ldots S(N-1))>T\},$$

where:

N is an index of a sentence in the segmented text stream which is the default number (e.g., N=1) of sentences to display to the left and to the right of a target sentence, T is a threshold specifying a minimum cumulative number of words that are present in the displayed sentences, length(S(k)) returns the length of the number of words in a sentence S(K), and "+" is an operation which means text concatenation.

In the example shown in FIG. 6B, T=10 and K=N−2.

Note that when the number of words is small (e.g., due to short sentences to the left or right of a target sentence), more sentences may be added to provide sufficient context. In an embodiment, K may exceed N (e.g., K=2 when N=1), but K should only be as large as needed to obtain a sufficient number of words for display (e.g., threshold T).

Moreover, if the sentences to the right are too short, processor 320 may automatically retrieve additional sentences S(N+1), S(N+2), . . . S(K) from a segmented text stream until their cumulative length exceeds T words. In that case, the formula to determine index K is as follows:

$$K=\min\{K: K>N \ \& \ \text{length}(S(N+1)+S(N+2)+ \ldots S(K))>T\}.$$

One of ordinary skill in the art would appreciate the embodiments shown in FIGS. 6A and 6B are illustrative examples, and the actual window and sub-window locations can be changed and displayed in any manner. For example, FIG. 6C shows an alternative presentation with sub-window 660, having different positioning with respect to summary paragraph 650. Additionally, the phrase "Basically, you can just keep the cables." is presented differently in sub-window 640 and sub-window 660.

FIG. 6D shows an embodiment which displays a portion of text from a segmented text stream in a sub-window 680, where the portion of text is associated with a sentence in summary paragraph 670. In an embodiment, processor 320 may detect a selection of a key word associated with a first sentence in the agent summary paragraph and/or the customer summary paragraph, and identify a predetermined number of sentences proximate to the first sentence in the segmented agent text stream and/or the segmented customer text stream, where the proximate sentences include the selected key word. Processor 320 may display the first sentence and the sentences proximate to the first sentence. Accordingly, another way of providing additional insight into the discussion of a particular topic may be to show the nearest sentences with the matching key words. For example, if an agent wants to learn more about the of 'box'—discussion as indicated by the third sentence in the summary, the agent could press a key (for example the SHIFT key), hover the mouse over the word "box" in that sentence and click once. The system will display two additional sentences containing the word 'box' from the agent spoken text before and after the target sentence FIG. 6E shows an embodiment which displays a portion of text from a segmented text stream in a sub-window 690, where the portion of text is associated with a sentence in summary paragraph 685. In the embodiment shown in FIG. 6E if the agent performs a combination of predefined actions, such as a double click while pressing the shift key and hovering the mouse over the target word, then processor 320 may display four additional sentences with the target word (if possible) such as two sentences that came before the target sentence (or word) and two sentences that came after as provided in a segmented text stream. This embodiment may provide more context of the dialog between the agent and the customer.

In other embodiments, the agent may use various commands (e.g., key combinations and/or mouse commands) to access other forms of data associated with target work and/or sentence. For example, the agent may elect to play the audio of the dialog correlated (associated) with a keyword and/or a sentence in a summary paragraph (instead of, or in addition to, a segmented text stream. This may be useful in assisting the agent in clarifying confusing text that may be associated with transcription errors. In another embodiment, key words and/or sentences may be used as hyperlinks to access additional information associated with the summary paragraphs.

In the preceding, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 4, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   extracting sentences from an agent text stream and a customer text stream based upon frequencies of words and terms of interest;
   generating an agent summary based on the extracted sentences from the agent text stream;
   generating a customer summary based on the extracted sentences from the customer text stream; and
   identifying keywords associated with the agent summary and the customer summary.

2. The method of claim 1, further comprising:
   receiving a transcript of a dialog between an agent and a customer;
   identifying a first text stream within the transcript as the agent text stream; and
   identifying a second text stream within the transcript as the customer text stream.

3. The method of claim 1, wherein the extracting sentences further comprises:
   segmenting the agent text stream and customer text stream into sentences; and
   labeling sentences associated with the segmented agent text stream and the segmented customer text stream.

4. The method of claim 3, wherein the segmenting the agent text stream and customer text stream into sentences comprises:
   assigning punctuation to the agent text stream and customer text stream using a deep neural network model, wherein the deep neural network model includes at least one of a convolutional neural network model, a bidirectional long term memory model, or a transformer model.

5. The method of claim 3, wherein the labeling sentences associated with the agent text stream and the customer text stream comprises:
   assigning an index to each sentence in the segmented agent text stream and to each sentence in the segmented customer text stream.

6. The method of claim 3, wherein the generating the agent summary and the customer summary comprises:
   applying a summarization model to the segmented agent text stream and the segmented customer text stream, wherein the summarization model includes at least one of an extractive summarization model based on natural language processing, or an abstractive summarization model based on a transformer model.

7. The method of claim 6, wherein the applying the extractive summarization model comprises:
   determining the terms of interest belonging to distinct subject classes; and
   assigning frequency related weights to each word in a segmented text stream, wherein particular weights are assigned to emphasize words that are the terms of interest in the segmented text stream.

8. The method of claim 3, further comprising:
   generating an interface for interacting with at least one of the agent summary or the customer summary based on the identified key words, wherein the interacting comprises:
   detecting a selection of a key word in at least one of the agent summary or the customer summary;
   identifying an index of a sentence in at least one of the segmented agent text stream or the segmented customer text stream based on the detected selection of the key word; and
   displaying sentences corresponding to a predetermined range of indices from at least one of the segmented agent text stream or the segmented customer text stream, wherein the predetermined range of indices bound the identified index.

9. The method of claim 8, wherein generating the interface for the interacting with at least one of the agent summary or the customer summary based on the identified key words comprises:
   detecting a selection of a sentence in at least one of the agent summary or the customer summary;
   identifying an index of the detected sentence in at least one of the segmented agent text stream or the segmented customer text stream based on the detected selection of the sentence; and
   displaying neighboring sentences corresponding to a predetermined range of indices from at least one of the segmented agent text stream or the segmented customer text stream, wherein the predetermined range of indices bound the identified index associated with the selected sentence.

10. The method of claim 1, wherein the identifying keywords associated with each of the agent summary and the customer summary further comprise:
    finding keywords relevant to topics of interest, wherein topics of interest include information regarding equipment or services associated with a customer.

11. A device comprising:
    a communication interface;
    a memory for storing instructions; and
    a processor configured to execute the instructions to:
    extract sentences from an agent text stream and a customer text stream based upon frequencies of words and terms of interest;
    generate an agent summary based on the extracted sentences from the agent text stream;
    generate a customer summary based on the extracted sentences from the customer text stream; and
    identify keywords associated with the agent summary and the customer summary.

12. The device of claim 11, wherein the instructions further cause the processor to:
    receive a transcript of a dialog between an agent and a customer;
    identify a first text stream within the transcript associated with the agent; and
    identify a second text stream within the transcript associated with the customer.

13. The device of claim 11, wherein the instructions to extract sentences further cause the processor to:
    segment the agent text stream and customer text stream into sentences; and
    label sentences associated with the segmented agent text stream and the segmented customer text stream.

14. The device of claim 13, wherein the instructions to segment the agent text stream and customer text stream into sentences further cause the processor to:
    assign punctuation to the agent text stream and customer text stream using a deep neural network model, wherein the deep neural network model includes at least one of a convolutional neural network model, a bidirectional long term memory model, or a transformer model.

15. The device of claim 13, wherein the instructions to label sentences associated with the agent text stream and the customer text stream further cause the processor to:
- assign an index to each sentence in the segmented agent text stream and to each sentence in the segmented customer text stream.

16. The device of claim 13, wherein the instructions to generate the agent summary and the customer summary further cause the processor to:
- apply a summarization model to the segmented agent text stream and the segmented customer text stream, wherein the summarization model includes at least one of an extractive summarization model based on natural language processing, or an abstractive summarization model based on a transformer model.

17. The device of claim 16, wherein the instructions to apply the extractive summarization model further cause the processor to:
- determine the terms of interest belonging to distinct subject classes; and
- assign frequency related weights to each word in a segmented text stream, wherein particular weights are assigned to emphasize words that are the terms of interest in the segmented text stream.

18. The device of claim 13, wherein the instructions further cause the processor to:
- generate an interface for interacting with at least one of the agent summary or the customer summary based on the identified key words, wherein the interacting comprises:
  - detect a selection of a key word in at least one of the agent summary or the customer summary;
  - identify an index of a sentence in at least one of the segmented agent text stream or the segmented customer text stream based on the detected selection of the key word; and
  - display sentences corresponding to a predetermined range of indices from at least one of the segmented agent text stream or the segmented customer text stream, wherein the predetermined range of indices bound the identified index.

19. The device of claim 11, wherein the instructions to identify keywords associated with each of the agent summary and the customer summary further cause the processor to:
- find keywords relevant to topics of interest, wherein topics of interest include information regarding equipment or services associated with a customer.

20. A non-transitory computer-readable medium including instructions that, when executed by a processor of a device, cause the device to:
- extract sentences from an agent text stream and a customer text stream based upon frequencies of words and terms of interest;
- generate an agent summary based on the extracted sentences from the agent text stream;
- generate a customer summary based on the extracted sentences from the customer text stream; and
- identify keywords associated with the agent summary and the customer summary.

* * * * *